(12) United States Patent
Clark et al.

(10) Patent No.: US 7,404,150 B2
(45) Date of Patent: Jul. 22, 2008

(54) SEARCHING DESKTOP OBJECTS BASED ON TIME COMPARISON

(75) Inventors: Bryan William Clark, Cambridge, MA (US); Seth Nickell, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 428 days.

(21) Appl. No.: 11/271,810

(22) Filed: Nov. 14, 2005

(65) Prior Publication Data

US 2007/0112732 A1    May 17, 2007

(51) Int. Cl.
*G06F 3/048* (2006.01)
(52) U.S. Cl. ............................. 715/810; 715/764
(58) Field of Classification Search ............... 715/810, 715/764
See application file for complete search history.

(56) References Cited

U.S. PATENT DOCUMENTS

| 5,621,880 | A | 4/1997 | Johnson |
| 5,842,009 | A | 11/1998 | Borovoy et al. |
| 6,507,838 | B1 | 1/2003 | Syeda-Mahmood |
| 6,847,959 | B1 | 1/2005 | Arrouye et al. |
| 2004/0125137 | A1* | 7/2004 | Stata et al. ............ 345/764 |

* cited by examiner

*Primary Examiner*—Doug Hutton
*Assistant Examiner*—Soumya Dasgupta
(74) *Attorney, Agent, or Firm*—MH2 Technology Law Group LLP

(57) ABSTRACT

Embodiments of the present invention provide a desktop search tool that allows users to efficiently retrieve or locate a desired object on their computer. Users specify their search based on a time context. In addition, the desktop search tool may provide its results in a temporal context to assist the user in browsing through the results.

19 Claims, 4 Drawing Sheets

SEARCHING DESKTOP OBJECTS BASED ON TIME COMPARISON

DESCRIPTION OF THE INVENTION

1. Field of the Invention

The present invention relates generally to the retrieval of information in a computer system.

2. Background of the Invention

Today, computers are capable of storing a vast quantity of information and data. Increasingly, users are finding it difficult to find a desired object, such as a object, e-mail, document, picture, etc. on their computer. In response, companies, such as Google, Yahoo, and Microsoft, have released desktop search programs that are available for download.

Although the known desktop search programs each have their own look and feel, their operation is essentially the same. Typically, these programs attempt to match the terms in the search query to the documents and objects stored on the user's desktop computer. The search terms may be entered in a variety of forms, such as in the form of a Boolean search or natural-language query.

Unfortunately, a user often struggles with selecting or remembering the appropriate search terms. For example, a user may not remember the name of a object or document. Even if the user has a search term in mind, at times the list of search results can become long and cumbersome. The user is then required to sift through the search results and identify their desired information. Accordingly, known desktop search program may still fail to significantly reduce the time and effort a user expends to identify and retrieve useful information on their desktop computer.

Therefore, it may be desirable to provide a desktop search tool that allows a user to easily find a desired object. In addition, it may be desirable to provide a desktop search tool that allows a user to efficiently browse through the results of a search.

SUMMARY OF THE INVENTION

In accordance with one feature of the invention, methods and apparatus for searching for objects stored on a computer are provided. In some embodiments, a window is provided that indicates objects stored on the computer. Selections of a user are then detected. The selections specify at least one of the objects and a time direction from the specified objects. A time relation is determined based on the selections of the user and a search is performed based on the time relation.

In accordance with another feature of the invention, methods and apparatus for searching for objects are provided. A timeline and a range on the timeline are displayed. A set of objects that are stored on the computer are identified. A group of icons for each identified object is then displayed. One icon in each group represents the identified object and other icons in the group may represent selectable time directions from the identified object, such as before, near, or after. The icons are selectable by a user and a time relation is displayed along the timeline. The time relation generally corresponds to icons selected by the user. Objects stored on the computer are then searched based on the time relation.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a desktop search tool that allows users to efficiently retrieve or locate a desired object on their computer. The desktop search tool may be capable of searching through a wide variety of object types, such as documents, e-mail messages, spreadsheets, images, audio objects, video objects, and the like. An object may also relate to various events, such when the user watched a movie, an appointment in a calendar program, or a phone.

Users may specify their search in a variety of forms. For example, users may specify their search based on relative time criteria, such as before, near, or after times associated with a selected object. Based on the time criteria, the desktop search tool may then determine a time relation for performing the search. A time relation relates to any times defined by the relative criteria specified by the user.

In addition, the desktop search tool may provide its results in a temporal context to assist the user in sifting through the results. For example, the results may be presented in one or more windows and the user may then modify or specify a new time relation to filter the results. The desktop search tool may also combine its time relation search techniques with known search techniques, such as keyword searches.

The results may be weighted to highlight objects that may be memorable to a user. For example, photo-type objects may be considered more memorable than email objects, and thus, given a higher ranking or weight. Objects authored by the user may also be weighted more than externally authored objects, such as emails or downloaded files. As another example, objects may be weighed based on how often or how long the user accessed the object.

Reference will now be made in detail to exemplary embodiments of the invention, which are illustrated in the accompanying drawings. Wherever possible, the same reference numbers will be used throughout the drawings to refer to the same or like parts.

Figure 1:
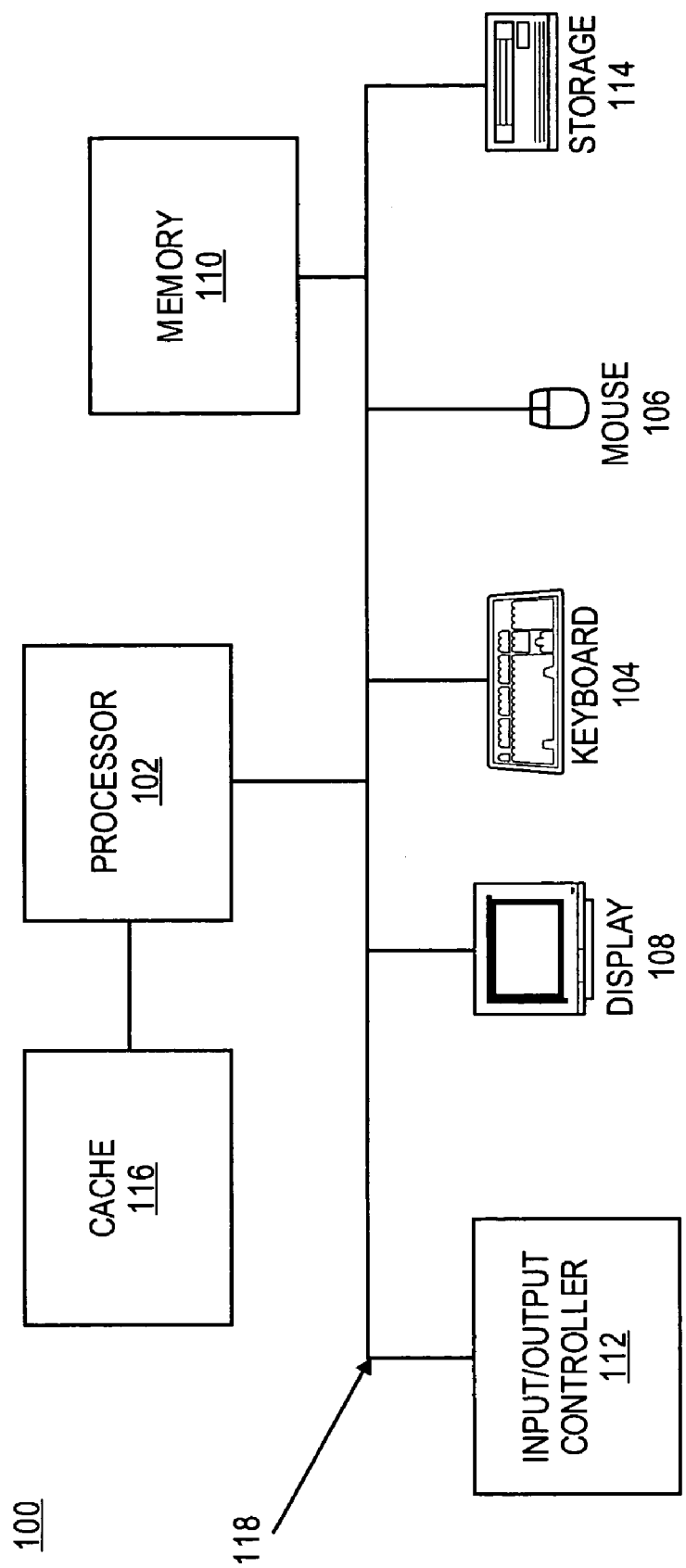
FIG. 1 illustrates a computer system that is consistent with the principles of the present invention.

FIG. 1 illustrates a computer system 100 that is consistent with the principles of the present invention. System 100 may be a general purpose computer that is well known to those skilled in the art. Examples of the components that may be included in computer system 100 will now be described. For purposes of explanation, embodiments of the present invention will be explained with reference to a desktop computer. However, one skilled in the art will recognize that the embodiments of the present invention may be implemented on virtually any device, such as a laptop computer, personal digital assistant, smart phone, and the like, in which a user stores and accesses objects.

As shown, a computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

Figure 2:
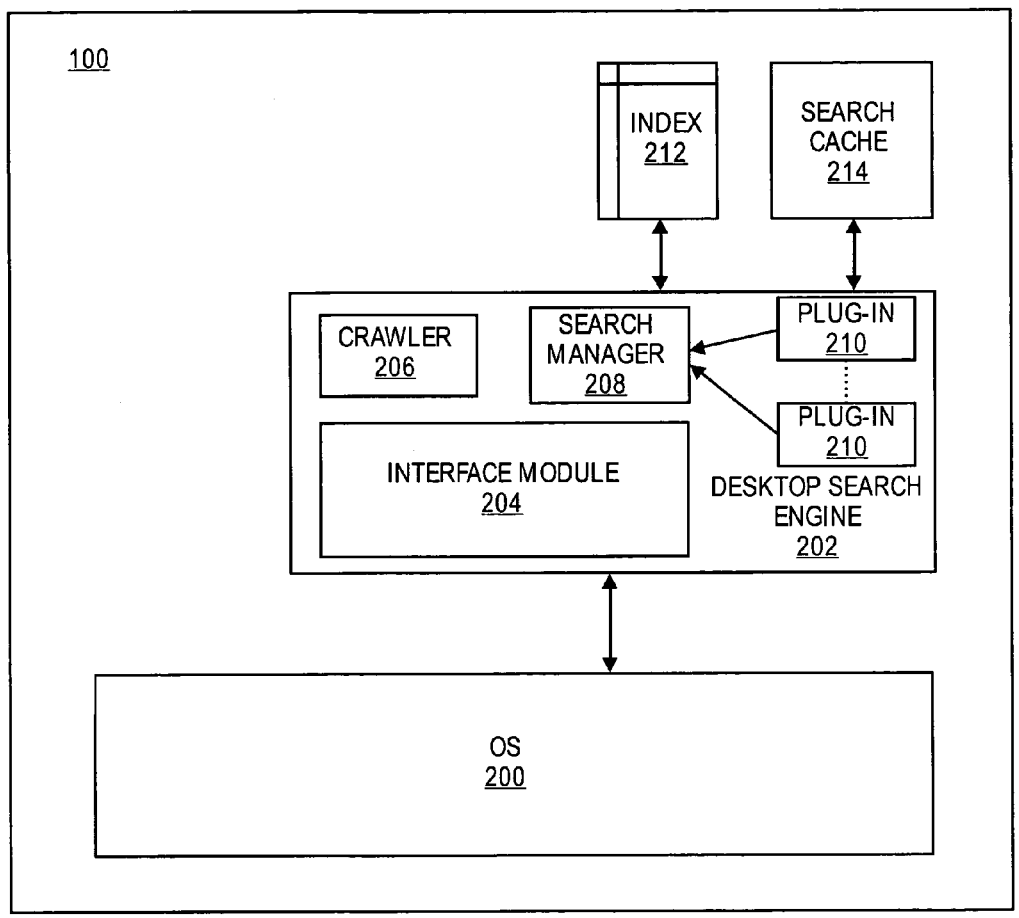
FIG. 2 illustrates a function block diagram of a system that is consistent with the principles of the present invention.

FIG. 2 illustrates a function block diagram of system 100 that is consistent with the principles of the present invention. As shown, system 100 may include an operating system ("OS") 200 and a desktop search tool desktop search engine 202. Additional application programs (not shown), such as word processing programs, spreadsheet programs, and media players, may also be installed on system 100. The components of system 100 shown in FIG. 2 will now be further described.

OS 200 is an integrated collection of routines that service the sequencing and processing of programs and applications by system 100. OS 200 may provide many services for computer system 100, such as resource allocation, scheduling, input/output control, and data management. OS 200 may be predominantly software, but may also comprise partial or complete hardware implementations and firmware. Well known examples of operating systems that are consistent with the principles of the present invention include Mac OS by Apple Computer, LINUX, Java and Sun Solaris by Sun Microsystems, Windows by Microsoft. Corporation, Microsoft Windows CE, Windows NT, Windows 2000, and Windows XP.

desktop search engine 202 provides the ability to search for objects stored on system 100. It is to be understood that while the embodiment described herein explains desktop search engine 202 as a stand alone application program, one skilled in the art will recognize that desktop search engine 202 may be incorporated or integrated with other application programs running on system 100. For example, desktop search engine 202 may operate in conjunction with an Internet browser application, such as Microsoft Internet Explorer or Mozilla Firefox, to perform a coordinated search on the Internet as well as for relevant objects on system 100. In addition, desktop search engine 202 may be configured to share information with other applications on system 100. For example, desktop search engine 202 may automatically use the same search terms used in an Internet search. As another example, desktop search engine 202 may automatically perform a search based on data shared from a calendar or e-mail program, such as Microsoft Outlook.

As shown in FIG. 2, desktop search engine 202 may further comprise an interface module 204, a crawler 206, a search manager 208, and one or more plug-ins 210. These components may be implemented as software, which is uploaded and stored into memory 110 of system 100. The software components may be written in a variety of programming languages, such as C, C++, Java, etc. In addition, desktop search engine 202 may be coupled to a search index 212 and a search cache 214. Search index 212 and search cache 214 may be implemented as a data structure or database in memory 110 or storage 114 of system 100. The components of desktop search engine 202 will now be further described.

Interface 204 provides a user interface for controlling the operation of desktop search engine 202. Interface 204 may leverage existing graphical user interface environments (such as Windows or browsers) to display on-screen data and options, usually in the form of icons and menus in response to user commands. Options provided by interface 204 may be selected by the user through the operation of hardware, such as mouse 106 and keyboard 104. These interfaces are well known in the art.

In some embodiments, interface 204 may allow the user to specify a search. For example, interface 204 may provide one or more windows or dialog boxes that allow the user to enter one or more search terms, specify a object type, specify a location (such as a folder or hard drive), and specify a date or time.

In some embodiments, interface 204 may provide a persistent or on-demand query area, a menu bar, or other object that appears on the desktop area of system 100. The query area may allow search queries, document/URL requests, and other types of queries to be entered at any time.

In addition, interface 204 may allow the user to specify a time context for their search. In particular, interface 204 may provide a listing of objects that the user has accessed over a period of time. Each object may have a respective time and date associated with it, such as when it was last modified or opened. Other time based statistics may include: when the object was created; when the object was last opened; when the object was last saved; when the object was last printed; the amount of time the object has been edited; and the like. Such statistics are well known to those skilled in the art. For example, OS 200 may collect statistics about various objects and store this information as meta data that is associated with the object. The user may then select one or more of these objects to specify their search based on relative time criteria. For example, the user may select directions, such as "before," "near," or "after," for the relative time criteria.

Specifying a time context for a search may be useful to the user for several reasons. As noted, a user may struggle with selecting search terms for various reasons. However, many users are able to easily recall objects relative to other objects. For example, a user will often recall that they worked on a particular document around the same time as another document. Alternatively, a user will often recall that they opened a particular object just before or after a particular appointment or date. Thus, embodiments of the present invention provide an interface that facilitates this characteristic of a user's recollection.

For example, in some embodiments, interface 204 may provide a sample of objects that the user may consider memorable. These objects may be considered memorable by interface 204 based on a variety of factors. Memorable objects may include: objects of a certain type, such as an image or document; objects that were recently modified or opened may be considered memorable; objects that were modified or opened several times (but perhaps in the past); audio or video objects; and objects that were modified or opened on certain dates, such as a holiday. Of course, interface 204 may be configured to provide a relatively wide scope for this sample of objects.

Interface 204 may also display the sample of objects in a variety of ways. For example, interface 204 may display a higher number of objects that were recently opened or modified. Recent objects may relate to objects that were opened or modified within the current day, within current week, etc. Interface 204 may determine what is considered recent based on a user setting or by default. An exemplary screen shot is provided and described with reference to FIG. 3.

Once search results have been obtained, interface 204 may then display the results. Interface 204 may generate a navigational result window to display one or more of the results. The results may be sorted or ordered based on a variety of criteria. For example, the results may be weighted and ranked according to: an object's type; whether the user authored or created the object; how frequently an object was accessed, such as for editing or printing; and the like. In addition, the results may be highlighted based on various criteria. For example, results that are the same type as the ones used by the user to specify the time relation may be highlighted. In addition, the result window may be opened automatically in response to queries requested and may be automatically closed or hidden when a user's attention is detected elsewhere, such as when the user selects another application.

Interface 204 may display the results in the form of a visual summary that includes a time axis and indicate the objects or times specified by the user. Interface 204 may display the results in the form of thumbnails, icons, or in a listing. An exemplary screen shot is provided with reference to FIG. 3. Therefore, it may now be appreciated that a user viewing the display shown in FIG. 3 can readily ascertain the nature of each object and may quickly identify the desired object.

Crawler 206 is an automated program that navigates through the objects stored on system 100 and feeds information about the objects, such as time statistics, location, etc., to desktop search tool 100. Crawler 206 may operate continuously when system 100 is operating or at various times depending on user settings. In addition, crawler 206 may be configured to navigate through various types of objects that are well known to those skilled in the art. For example, crawler 206 may be configured to handle e-mails, Microsoft office objects (such as Word, Excel, and Powerpoint), Adobe Acrobat, contacts (such as Outlook contacts), instant messages, text objects, Web pages stored on system 100, image objects, audio objects, and executable objects (such as installation scripts or zip objects). Of course, crawler 206 may be configured to handle only selected types of objects, for example, based on user settings or a default setting.

Search manager 208 coordinates the operations of desktop search engine 202. In particular, search manager 208 may be responsible for accepting objects fed from crawler 206 and indexing these objects into search index 212. Search manager 208 is also responsible for conducting the search based on the input received from interface 204. Search manager 208 may work in cooperation with plug-ins 210 to perform various aspects of the search. In addition, search manager 208 may be responsible for providing the results to interface module 204.

Plug-ins 210 assist search manager 208 in performing the search. For example, one or more of plug-ins 210 may be configured to search the content of specific types of objects. As another example, one or more of plug-ins 210 may be configured to assist in handling a type of query, such as a natural language query. In addition, one or more plug-ins 210 may serve as an interface to another application running on system 100, such as an Internet browser.

Search index 212 serves as a data structure and mapping for locating objects matching a search. For example, search index 212 may be configured as a hash table, wherein search terms and time references are assigned a numerical value. In addition, search index 212 may provide other information, such as frequency information, meta-tag information, and weighting or ranking information.

Search cache 214 serves as a readily available memory for desktop search engine 202 for storing frequently accessed information. For example, search cache 214 may store recent results of recent searches or recent searches themselves. In addition, search cache 214 may store popular or frequently accessed objects. Of course, one skilled in the art will recognize that other items and objects may be stored in search cache 214.

Figure 3:
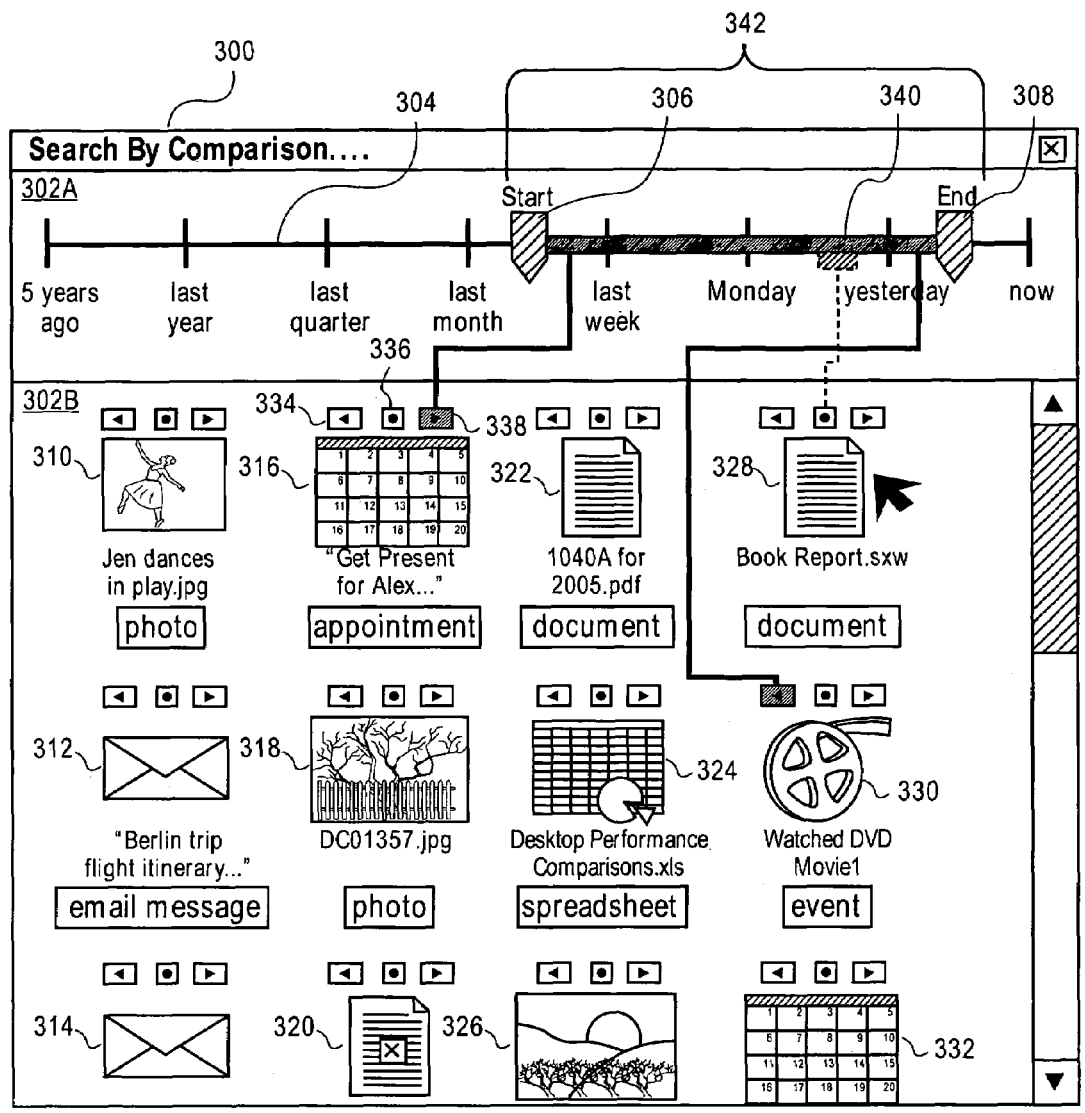
FIG. 3 illustrates an exemplary screen shot that may be provided by an embodiment of the present invention.

FIG. 3 illustrates an exemplary screen shot 300 that may be provided by an embodiment of the present invention. Interface module 204 may operate in conjunction with OS 200 and search manager 208 to provide such a screen. As shown, screen shot 300 may include a first portion 302A and a second portion 302B. The contents of these two portions and various operations associated with them will now be described. One skilled in the art will recognize that FIG. 3 merely illustrates one example of the screens that may be provided by embodiments of the present invention. Other well known types of displays and graphical user interface techniques may also be used by embodiments of the present invention.

First portion 302A may provide a summary or map of the search conducted by the user. For example, a timeline 304 may indicate a time range or history of the objects stored on system 100. Timeline 304 is shown with various intervals to indicate various time ranges. One skilled in the art will recognize that these intervals may be sized based on various factors. For example, timeline 304 may be divided into equal sized intervals that represent a given time interval, such as one day or one month. As another example, timeline 304 may be divided into intervals of varying lengths. As shown in FIG. 3, timeline 304 may include intervals that span from "now" to "yesterday," "yesterday" to "Monday," "Monday" to "last week," and so forth.

Timeline 304 may vary its displayed intervals based on user input received, for example, from mouse 106 or keyboard 104, as the user selects one or more objects. For example, first portion 302A may zoom in to provide further detail on a portion of timeline 304 in response to user input. As shown in FIG. 3, the user has placed start pointer 306 and end pointer 308 to indicate a desired range 342 for the search.

Timeline 304 may also be configured with intervals responsive to the characteristics of the objects stored on system 100. For example, if the oldest object on system 100 is 3 years old, then timeline 304 may show "3 Years Ago" as its oldest time. In addition, if a number of objects on system 100 have characteristic times within a certain interval, such as last month, then timeline 304 may be configured such that the interval for last month is provided additional length.

As to portion 302B, various icons, such as icons 310, 312, 314, 316, 318, 320, 322, 324, 326, 328, 330, and 332, may be displayed to provide a visual summary or sample of the objects stored on system 100. As shown, these icons may visually indicate the underlying file type or format of the object that it represents using text or graphics. For example, icons 310, 318, and 326 are configured to appear as a photo and have the text "photo" beneath them because the objects they represent is a JPEG image. Icons 312 and 314 are shown as envelopes and have the text "email message" appearing below them because the objects they represent are emails. Likewise, icons 320, 322, and 328 are configured to indicate that the objects they represent are documents. One skilled in the art will recognize that other graphical user interface techniques may be used to represent the objects stored on system 100.

As noted, portion 302B may include a sample of the objects stored on system 100. The objects included in the sample may be selected based on their memorable nature. For example, objects, such as photos, documents, events, appointments, etc., may be considered memorable. Photos may be considered memorable because of their visual nature. Documents that are frequently accessed or having long periods of being open may also be considered memorable and appropriate for inclusion in the sample shown in portion 302B. Events may be various actions that were performed by the user on system 100. For example, an icon may be associated with an event to indicate that the user had played a video game 4 hours on a particular day. As another example, icon 330 may be included in portion 302B to indicate that a user had once watched "Movie1" at some time, which may be considered memorable because of its length and visual nature. Hence, even events that have no archive or record like those of an application file may be indexed by desktop search engine 202 and indicated in interface 204 for the benefit of the user using icons that are associated with events. Of course, one skilled in the art will recognize that portion 302B may arrange icons 310-332 in various ways, such as by name, by type, by time or date, by size, etc.

Portion 302B may also be updated in various ways to assist the user. For example, icons 310-332 displayed in portion 362B may represent those objects that have assigned times within range 342. An assigned time of an object may be specified in a wide variety of ways. For example, an assigned time of an object may be the time it was created, the last time it was accessed or edited, the last time it was opened, and so forth. Such information may be collected and recorded by crawler 206 into index 212.

In addition, as the user selects one or more icons 310-332, portion 302B may be updated in response to the selections of the user. For example, if the user selects two photo objects, such as icon 310 and 318, then search manager 208 may interpret these actions to indicate that the user is likely interested in photos. Accordingly, search manager 208 may command interface module 204 to update portion 302B with more icons that represent photos. As another example, if the user selects two objects, such as icon 316 and 330, then search manager 208 may interpret these actions to indicate that user is likely interested in a specific time period. In response, search manger 208 may have portion 302B updated to filter out icons of objects that are outside of this time period and to include more icons for objects that have assigned times in proximity to this time period. For example, portion 302B may be updated to include icons of more objects that have assigned times within the time period and one or more icons of objects that have assigned times within a close range of the borders of this time period, such as a few minutes, a few hours, one or more days, etc. One skilled in the art will recognize that portion 302B may be updated in an iterative fashion to filter out or narrow the icons displayed.

Other visual cues may also be provided in screen shot 300 to assist the user in specifying a search. For example, each of the icons in portion 302B may further have icons displayed for "time direction" buttons 334, 336, and 338. These time direction buttons may be configured to allow the user to easily specify a relative direction, such as before, near, or after, in which the user wishes to focus a search. In particular, time direction button 334 may indicate that the user is interested in objects that are older than the current selected object. Time direction button 336 may indicate that the user is interested in objects that have approximately the same (or exactly the same) assigned time as the current selected object. Time direction button 338 may indicate that the user is interested in objects that are newer than the current selected object. For example, as shown in FIG. 3, the user has selected icon 328 and the time direction button, which indicates the user interested in objects that have approximately the same assigned time as the object represented by icon 328. As an additional visual aid, a trace line may originate from icon 328 and point to a range 340 on timeline 304. The user may then confirm that range 340 is indeed the time period of interest, for example, by hitting "Enter" on keyboard 104 or selecting an appropriate button (not shown in FIG. 3) with mouse 106.

As another example, the user may select icons 316 and 330 to define the boundaries of another time period of interest. As shown in FIG. 3, trace lines have been displayed from the selected time direction buttons of icons 316 and 330 to indicate the time period specified by the user. These trace lines may also be drawn back to timeline 304 in order to indicate the relative time positions of icons 316 and 330. The user may then again confirm this time period based on input from keyboard 104 or mouse 106.

As a supplement to specifying a time period, interface module 204 may also provide one or more windows for entering search criteria, such as keywords, a file type, etc., using well known pull down menus and the like. Search manager 208 may then search for the objects that match the criteria and time period specified by the user.

Portions 302A and 302B may be updated to indicate the results of the search. For example, search manager 208 may iteratively filter the information that appears in portions 302A and 302B until the desired objects have been retrieved. The user may indicate that the desired object has been in various ways, such as opening the object.

Alternatively, search manager 208 may command interface module 204 to provide the results in a separate display window or file. Of course, the results may be indicated and sorted in various ways that are convenient to the user. For example, the results may be sorted by file type, date, relevance, etc.

Figure 4:
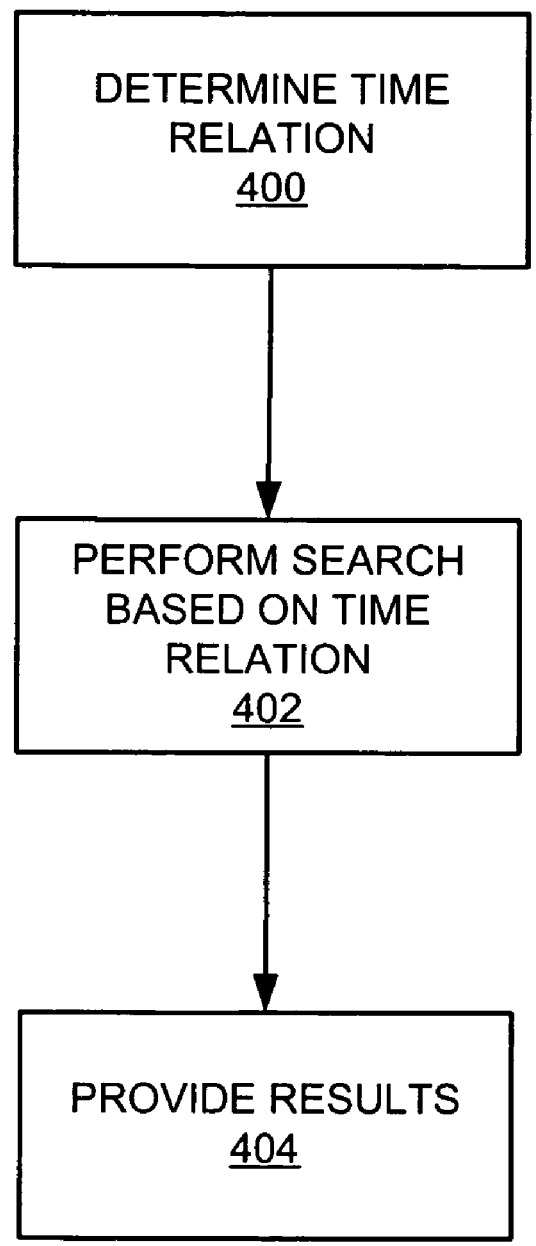
FIG. 4 illustrates an exemplary process flow that is consistent with the principles of the present invention.

FIG. 4 illustrates an exemplary process flow that is consistent with the principles of the present invention. Embodiments of the present invention may provide methods of searching for objects on a computer system based on comparison to a time relation. Of course, the user may also couple this with well known search techniques, such as those based on keywords and other explicitly criteria. One example of such a process will be described with reference to FIG. 4.

As shown, in stage 400, a user may specify a search based on relative time criteria. A time relation may then be determined from the criteria entered by the user. For example, the user may invoke desktop search engine 202. Window 300 may then be displayed to the user.

As noted above, the user may specify the search in a wide variety of ways. For example, the user may move icons 306 and 308 to specify a rough or approximate time context, such as range 342, for their search. In response, portion 3002B of window 300 may be updated to reflect a new sample of objects that are within range 342. Of course, portion 302B may also extend the times associated with range 342 within a tolerance. Such a tolerance may be helpful to avoid unduly limiting a search.

In addition, the user may select one or more objects from portion 302B. The user may select icons 316 and 330 to define the boundaries of time period of interest. The user may then confirm their selections and desired time criteria based on input from keyboard 104 or mouse 106.

As a supplement to specifying a time period, interface module 204 may also provide one or more windows for entering search criteria, such as keywords, a file type, etc., using well known pull down menus and the like. Search manager 208 may then determine the time relation that corresponds to the relative time criteria specified by the user. For example, search manager 208 may calculate a time period. Of course, search manager 208 may also factor a tolerance or range as part of calculating this time period. Processing may then flow to stage 402.

In stage 402, desktop search engine 202 performs the search based on the time relation. In addition, desktop search engine 202 may use other criteria, such as the types of objects selected by the user, and keywords entered by the user, when performing the search. For example, search manager 208 may search through index 212 to find objects having assigned times that are within the time relation.

In addition, search manager 208 may rank or weight the results based on various factors. For example, search manager 208 may attempt to emphasize memorable results more highly. A memorable result may be identified based on factors, such as the object's type, the object's author or creator, and how often the object has been accessed by the user. Search manager 208 may also consider other criteria entered by the user, such as a specific keyword or file location on system 100 when ranking or weighting the results. Processing may then flow to stage 404.

In stage 404, one or more results are presented to the user. For example, interface module 204 may provide one or more new windows. The windows may display the results in various forms, such as an ordered list or arrangement of icons corresponding to each result. As another example, interface module 204 may update portion 302B to reflect the results of the search. Interface module 204 may sort or list the results based on various criteria, such as object type, object name, times associated with object, the ranking of the object, etc. Such criteria for sorting are well known to those skilled in the art. The user is then free to browse through the results and may then ultimately select one or more as desired.

Processing may then be repeated at stage 400. For example, the user may elect to define a different or narrower time relation. The user may also indicate a new search is desired and repeat processing at stage 400.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of searching for objects stored on a computer, said method comprising:
    displaying a timeline;
    displaying a range on the timeline;
    identifying a set of objects that are stored on the computer;
    displaying a group of icons for each of the identified objects, wherein at least one icon in the group represents the identified object and at least one additional icon in the group represents selectable time directions from the identified object;
    determining at least one icon, from the displayed group of icons, that has been selected by a user;
    displaying, along the timeline, a time relation that corresponds to the at least one icon selected by the user; and
    searching for objects stored on the computer based on the time relation.

2. The method of claim 1, wherein displaying the timeline comprises displaying the timeline with a set of intervals having an equal length.

3. The method of claim 1, wherein displaying the timeline comprises displaying the timeline with a boundary that is responsive to an age of at least one of the set of objects stored on the computer.

4. The method of claim 1, wherein displaying the timeline comprises displaying the timeline with a set of intervals having varying length, wherein intervals that represent recent time on the timeline are longer than intervals that represent older times on the timeline.

5. The method of claim 1, wherein displaying the timeline comprises:
    displaying the timeline with a set of intervals having varying length, wherein the length of at least one interval on the timeline is varied based on a number of objects from the set of objects have associated times within a time period represented by the at least one interval.

6. The method of claim 1, wherein displaying, along the timeline, the time relation that corresponds to the at least one icon selected by the user comprises:
    identifying the object that corresponds to the at least one icon selected by the user;
    determining a time assigned to the object; and
    highlighting a portion of the timeline that corresponds to the time assigned to the object.

7. The method of claim 1, wherein displaying, along the timeline, the time relation that corresponds to the at least one icon selected by the user comprises:
    identifying the object that corresponds to the at least one icon selected by the user;
    determining a range of times associated with the object; and
    highlighting a portion of the timeline that corresponds to the range.

8. The method of claim 1, wherein displaying, along the timeline, the time relation that corresponds to the at least one icon selected by the user comprises:
    identifying the object that corresponds to the at least one icon selected by the user;
    identifying at least one event associated with the object;
    determining a range of times associated with the at least one event; and
    highlighting a portion of the timeline that corresponds to the range.

9. The method of claim 1, wherein displaying, along the timeline, the time relation that corresponds to the at least one icon selected by the user comprises:
    identifying a plurality of objects that correspond to icons selected by the user;
    determining times assigned to each of the plurality of objects; and
    highlighting a portion of the timeline that corresponds to the times assigned to each of the plurality of objects.

10. The method of claim 1, wherein identifying a set of objects that are stored on the computer comprises:
    determining a range of time requested by the user; and
    determining a sample of objects having assigned times that are in proximity to the range.

11. The method of claim 1, wherein identifying a set of objects that are stored on the computer comprises:
    determining a range of time requested by the user; and
    determining a random sample of objects having assigned times that are in proximity to the range.

12. The method of claim 1, wherein identifying a set of objects that are stored on the computer comprises:
    identifying the object that corresponds to the at least one icon selected by the user;
    determining a type for the identified object; and
    selecting other objects having the same type as the identified object.

13. The method of claim 1, displaying the timeline comprises:
    displaying at least one boundary icon that is movable by the user along the timeline, wherein the at least one boundary icon indicates a boundary for the search for objects stored on the computer.

14. The method of claim 13, wherein displaying the group of icons for each identified object comprises:
    identifying objects having assigned times that are within the boundary indicated by the at least one boundary icon; and updating the groups of icons to indicate at least some of the identified objects.

15. The method of claim 1, further comprising:
determining objects that are within the time relation;
ranking the objects based on an author for each of the objects; and
displaying a set of results that indicate the objects matching the time relation and the ranking.

16. The method of claim 1, further comprising:
determining objects that are within the time relation;
ranking the objects based on a length of time each object has been accessed by a user of the computer; and
displaying a set of results that indicate the objects matching the time relation and the ranking.

17. The method of claim 1, further comprising:
determining objects that are within the time relation;
ranking the objects based on a number of times each object has been accessed; and
displaying a set of results that indicate the objects matching the time relation and the ranking.

18. A computer for searching for objects stored on the computer, wherein the computer is configured by program code to implement the method of claim 1.

19. A computer readable medium storing computer executable program code for implementing the method of claim 1.

* * * * *